J. H. DORAN.
GEARING.
APPLICATION FILED NOV. 12, 1917.
1,267,855.
Patented May 28, 1918.
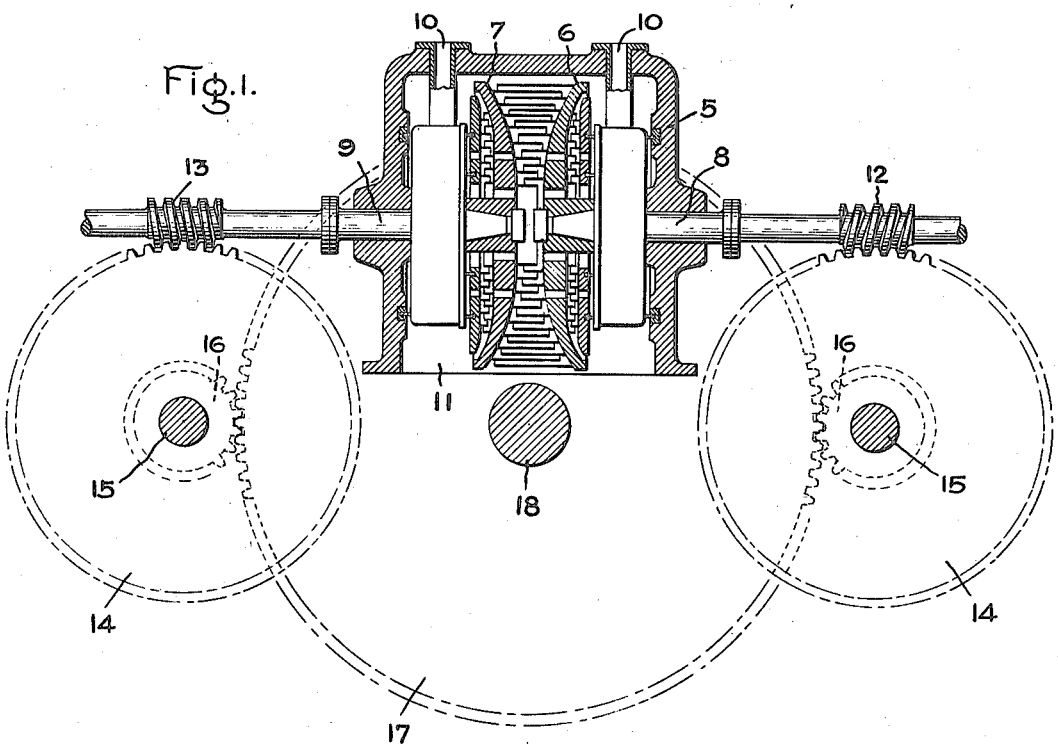
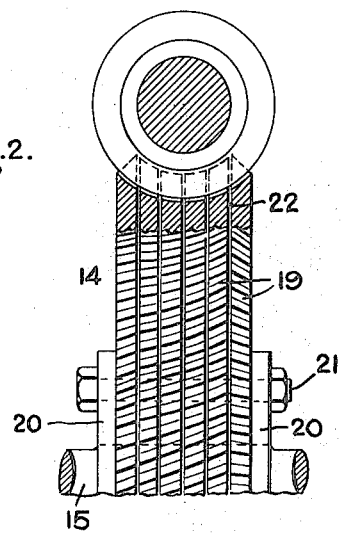
Inventor:
John H. Doran,
by [signature]
His Attorney.

UNITED STATES PATENT OFFICE.

JOHN H. DORAN, OF SCHENECTADY, NEW YORK, ASSIGNOR TO GENERAL ELECTRIC COMPANY, A CORPORATION OF NEW YORK.

GEARING.

1,267,855.  Specification of Letters Patent.  Patented May 28, 1918.

Application filed November 12, 1917. Serial No. 201,665.

*To all whom it may concern:*

Be it known that I, JOHN H. DORAN, a citizen of the United States, residing at Schenectady, in the county of Schenectady, State of New York, have invented certain new and useful Improvements in Gearing, of which the following is a specification.

The present invention relates to gearing and particularly to gearing intended for use in connection with elastic fluid turbines of the type having two rotors which revolve in opposite directions although it is not necessarily limited thereto. In the use of such turbines it is often desirable to transmit the power from the shafts on which the two rotors are mounted, and which may be termed driving shafts, to a single driven shaft, and in such case, as is obvious, the direction of rotation of one rotor shaft must be translated into rotation in the opposite direction before it can be applied to the driven shaft to which the power is to be transmitted. The object of my invention is to provide an improved structure and arrangement for accomplishing this purpose.

According to my invention I transmit the power from the two oppositely rotating driving shafts to the driven shaft through the intermediary of suitable gearing, and I translate the direction of rotation of one of the driving shafts into rotation in the opposite direction by means of a worm and worm wheel which is either right-hand or left-hand as required, and is located between the one driving shaft and the driven shaft. The other driving shaft may be connected to the driven shaft by any suitable gearing arrangement, but is preferably connected thereto through a worm and worm wheel similar to that which connects the first driving shaft thereto, differing therefrom only in that it is oppositely handed. In other words, when the power is transmitted from both driven shafts to the driving shaft through worm gearing, one worm will be right-handed and the other left-handed. The worm or worms are preferably located directly on the driving shaft or shafts, or on extensions thereof, and transmit power to a worm wheel from which power is transmitted to the driven shaft. When transmitting considerable power, the worm wheels must of necessity be quite wide to obtain a large area of contact between the worm and the worm wheel, and to insure an even distribution of the power over the face of the worm wheel I preferably construct it of a number of plates or disks of suitable width which are clamped together at their central portions and slightly spaced apart at their peripheries. In case of excess pressure on any disk or plate, due to concentration of load at such point, it will yield or deflect slightly, thus moving relative to the other plates or disks relieving somewhat the pressure on such plate or disk and transferring it to the other plates or disks. By this means an even distribution of load over the worm wheel may be obtained.

In the drawing, Figure 1 is a diagrammatic view of an embodiment of my invention, and Fig. 2 is a view partly in section of a worm and worm wheel.

Referring to the drawing, 5 indicates an elastic fluid turbine casing in which are two oppositely rotating rotors 6 and 7 carried by shafts 8 and 9. In the present instance a turbine of the radial flow type is shown, elastic fluid being admitted through conduits 10 and exhausting at 11. On the shafts 8 and 9 or suitable extensions coupled thereto, are worms 12 and 13, one of which is right-handed and the other left-handed. The worms 12 and 13 mesh with worm wheels 14 which may be alike in structure and which are carried on counter-shafts 15 from which power is transmitted by suitable gear wheels 16 on shafts 15 to a gear wheel 17 on driven shaft 18. This gives a double reduction in speed between the driving shafts and the driven shaft and serves to cause both driving shafts to drive the driven shaft in the same direction. The worm wheels 14 are shown as formed of a plurality of plates or disks 19 which are clamped together at their central portions between end plates 20 by means of suitable bolts 21 and are slightly spaced apart at their peripheries as indicated at 22 for the purpose already explained.

When the turbine is in operation the rotor 6 revolves in one direction and the rotor 7 in the other direction, as is well understood. This turns the shafts 8 and 9 of the respective rotors and the worms 12 and 13 in opposite directions, but since worms 12 and 13 are oppositely handed the result is that worm wheels 14 are turned both in the same direction. From worm wheels 14 power is transmitted to driven shaft 18 through gear wheels 16 and 17, as is obvious.

This arrangement, it will be seen, gives a direct power transmission and avoids the use of an idler gear wheel to translate the direction of rotation of one of the driving shafts.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. In combination, a pair of oppositely rotating driving shafts, a driven shaft, and means for transmitting power from said driving shafts to said driven shaft, comprising a worm for translating the direction of rotation of one of the driving shafts.

2. In combination, a pair of oppositely rotating driving shafts, a driven shaft, and means for transmitting power from said driving shafts to said driven shaft, comprising a right-hand worm associated with one driving shaft, and a left-hand worm associated with the other.

3. In combination, a pair of oppositely rotating shafts, a third shaft, means including a worm and worm wheel for transmitting power from one of said pair of shafts to the third shaft, and means for transmitting power from the other of said pair of shafts to the third shaft.

4. The combination with an elastic fluid turbine having rotors which revolve in opposite directions, of a driven shaft, and means for transmitting power from said rotors to the driven shaft, said means comprising a worm and worm wheel through which power is transmitted from one of the rotors to the driven shaft.

5. The combination with an elastic fluid turbine having rotors which revolve in opposite directions, and shafts for said rotors, of a right-hand worm on one of said shafts, a left-hand worm on the other, a driven shaft, and means including worm wheels for transmitting power from said worms to the driven shaft.

6. In combination, a pair of oppositely rotating driving shafts, a driven shaft, and means for transmitting power from said driving shafts to said driven shaft, comprising a worm and worm wheel for translating the direction of rotation of one of said driving shafts, said worm wheel comprising a plurality of disks clamped together at their central portions and slightly spaced apart at their peripheries.

7. The combination with an elastic fluid turbine having rotors which revolve in opposite directions, of a driven shaft, and means for transmitting power from said rotors to said driven shaft, said means comprising a worm and worm wheel through which power is transmitted from one of the rotors to the driven shaft, said worm wheel comprising a plurality of disks clamped together at their central portions and slightly spaced apart at their peripheries.

In witness whereof, I have hereunto set my hand this 9th day of November, 1917.

JOHN H. DORAN.